United States Patent [19]

Ward

[11] 4,309,170
[45] Jan. 5, 1982

[54] VERTICAL SHAFT FURNACE

[75] Inventor: George C. Ward, Carrollton, Ga.

[73] Assignee: Southwire Company, Carrollton, Ga.

[21] Appl. No.: 127,684

[22] Filed: Mar. 6, 1980

Related U.S. Application Data

[60] Division of Ser. No. 967,679, Dec. 8, 1978, abandoned, which is a continuation of Ser. No. 812,291, Jul. 1, 1977, Pat. No. 4,129,742.

[51] Int. Cl.$^3$ ............................ F27D 1/08; C21B 7/08
[52] U.S. Cl. ........................................ 432/96; 13/2 P; 266/197
[58] Field of Search .................... 432/96, 97; 75/10 R; 266/197, 186, 187; 13/2 P, 9, 33

[56] References Cited

U.S. PATENT DOCUMENTS

| | | | |
|---|---|---|---|
| 2,112,908 | 4/1938 | Hamilton | 266/186 X |
| 2,161,180 | 6/1939 | Mary | 432/96 X |
| 3,199,977 | 8/1965 | Phillips et al. | 266/188 |
| 3,422,206 | 1/1969 | Baker et al. | 13/2 P |
| 3,603,571 | 9/1971 | Geiger, Jr. et al. | 266/197 |
| 3,658,307 | 4/1972 | Richardson et al. | 432/97 |
| 3,749,803 | 7/1973 | Camacho | 13/9 |

Primary Examiner—John J. Camby
Attorney, Agent, or Firm—Herbert M. Hanegan; Stanley L. Tate; Robert Steven Linne

[57] ABSTRACT

A vertical shaft furnace for continuously melting metal materials, such as scrap, copper cathode pieces and the like is disclosed. The furnace comprises an elongated cylindrical melting chamber having an opening in the upper portion thereof for intermittently gravity-charging the furnace with metal pieces, which form a descending metal column in the melting chamber. A plurality of plasma arc generators is mounted in the sidewalls of the melting chamber extending inwardly thereof in a downwardly inclined attitude. The plasma arc torches are arranged in upper and lower vertically spaced planes for respectively preheating and melting the metal charged to the furnace. Protective refractory shrouds are provided which extend inwardly from the inside wall of the melting chamber and at least partly surround the plasma arc torches to substantially prevent damage to the torches by the descending or dropped metal charge.

5 Claims, 4 Drawing Figures

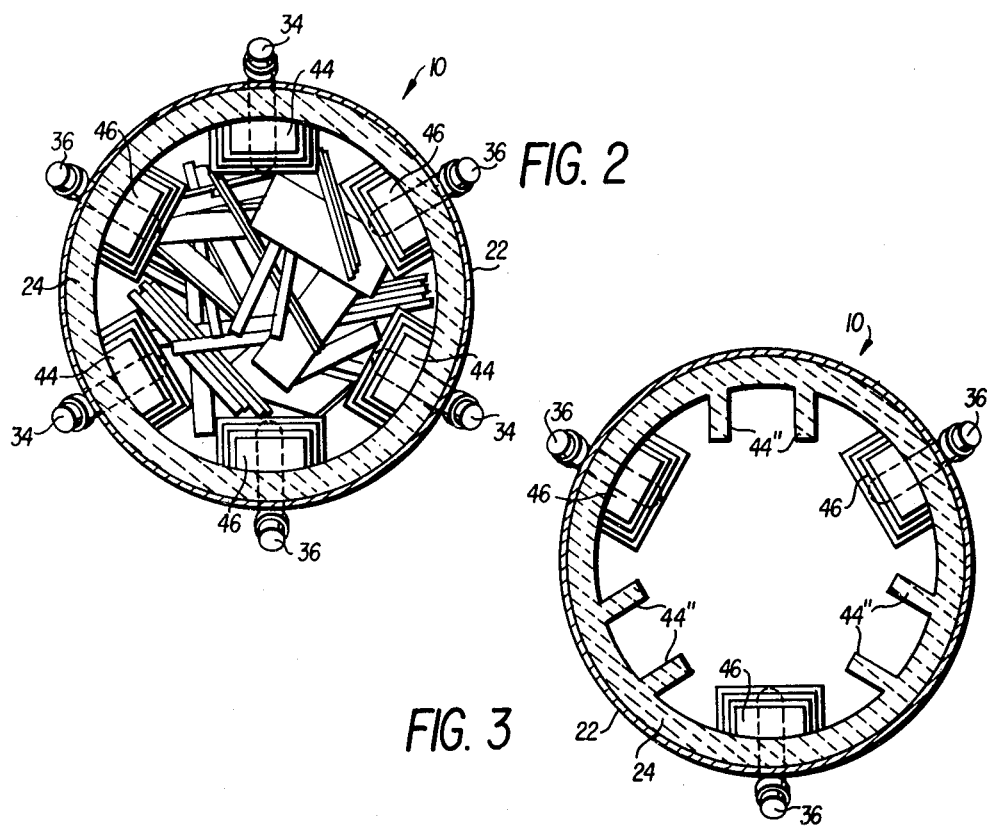
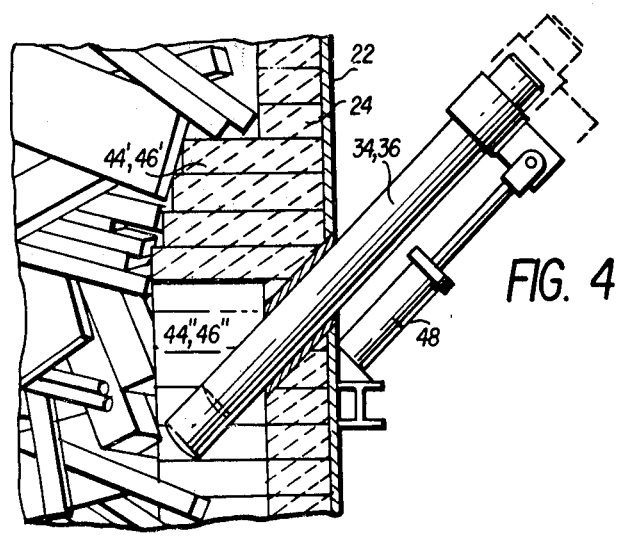

VERTICAL SHAFT FURNACE

RELATED APPLICATIONS

This application is a division of application Ser. No. 967,679 filed Dec. 8, 1978, now abandoned, which in turn is a continuation of application Ser. No. 812,291 filed July 1, 1977, and now U.S. Pat. No. 4,129,742.

BACKGROUND OF THE INVENTION

The present invention relates to electric arc furnaces and especially to an apparatus for rapid meltdown of raw and scrap metals. More particularly, the invention relates to a vertical shaft furnace employing sidewall-mounted plasma arc torches for rapidly producing a continuous supply of molten metal especially for use in continuous casting machines.

Meltdown of a continuously or semi-continuously supplied metal charge in a furnace for further processing, for example, in a continuous casting machine, requires the input of tremendous amounts of heat energy, some of which is necessarily dissipated or lost to the surroundings by radiation and conduction from the furnace. Thus, it is important, not only from economic considerations, but also from an energy conservation standpoint to accomplish meltdown in the shortest possible time so as to improve efficiency and minimize the amount of heat energy lost to the surroundings. It is known that the use of plasma arcs for melting metals in furnaces can significantly improve the meltdown rate because of the much higher temperatures involved, e.g., in some instances, as high as 10,000° to 20,000° K. It is also known to improve the efficiency of heat transfer from a plasma arc torch to a scrap metal charge in a furnace by the selective positioning of plasma arc torches mounted in the sidewalls of the furnace. Such plasma arc furnace apparatus are disclosed, for example, in U.S. Pat. Nos. 3,422,206 and 3,749,803. These prior art furnaces are not, however, readily adapted for continuously supplying molten metal to a continuous casting machine and must be frequently shut down to permit tapping of the molten metal therein with the consequent loss of time and dissipation of substantial amounts of heat energy. Other prior art furnaces employ plasma art torches for cold-mold remelting and refining of consumable metal bars into ingots and are exemplified by the furnace apparatus disclosed in U.S. Pat. Nos. 3,496,280 and 3,736,361.

In general, however, the use of plasma arc torches in metal melting furnaces has been limited to cold-mold remelting furnaces and other types of non-continuously operated furnaces such as those mentioned above. Although vertical fuel-fired shaft furnaces for continuously melting scrap metal are known, for example, from U.S. Pat. Nos. 3,199,977 and 3,788,623, plasma arc torches, so far as known, have not heretofore been utilized in such vertical shaft furnaces to produce a continuous supply of molten metal for casting in continuous casting machines. In conventional fuel-fired furnaces, intermittent or semicontinuous charging of the shaft furnace with a supply of scrap metal materials is readily and advantageously accomplished merely by dropping the material into the furnace via an opening adjacent the upper portion thereof and permitting the material to assume randomly disposed positions and form a vertical column of scrap which descends in the furnace shaft as the charge is melted. After charging, the charge opening is then closed and thereafter intermittently charged as necessary in the same manner with additional scrap material.

As noted in the aforementioned U.S. Pat. No. 3,199,977, this random charging procedure provides a less compact mass of metal charge and thereby enhances the melting rate. Such a time-efficient charging procedure of a vertical shaft melting furnace would not, however, be feasible if plasma arc torches were employed for melting the metal charge since the torch tips normally extend into the furnace beyond the interior wall thereof and in relatively close proximity to the metal charge so as to permit striking and maintaining the arc between the torch electrode and the charge. The torch tips would, therefore, be susceptible to extensive damage by either the dropped scrap material or the descending scrap metal charge.

SUMMARY AND OBJECTS OF THE INVENTION

In view of the foregoing, it should be apparent that there still exists a need in the art for a vertical shaft metal melting furnace employing sidewall-mounted plasma arc torches to significantly improve the heat input to the metal charge and thereby efficiently produce, in the shortest possible time and with the least amount of heat loss, a continuous supply of molten metal for use in a continuous casting machine.

It is therefore, an object of the present invention to provide a vertical shaft melting furnace adapted to be intermittently charged with metal during continued operation thereof and which employs sidewall-mounted plasma arc torches for rapid melting of the metal charge so as to minimize the loss of heat to the surrounding environment and for supplying molten metal to a continuous casting machine.

It is another object of the invention to provide a vertical shaft melting furnace having a charge opening and a plurality of downwardly inclined plasma arc torches mounted in the sidewalls below the charge opening and arranged in equi-angularly spaced relation in upper and lower vertically spaced planes for preheating and melting scrap metal charged to the furnace through the charge opening.

Another object of the invention is to provide a vertical shaft furnace having sidewall-mounted plasma arc torches for rapidly melting a metal charge wherein the plasma torches are protected from damage from a dropped or descending metal charge.

Still another object of the present invention is to provide refractory elements on the interior walls of a vertical shaft melting furnace for protectively shrouding sidewall-mounted plasma arc torches from damage by dropped or descending scrap metal charged to the furnace during operation of the plasma arc torches.

Briefly described, these and other objects of the invention that may become hereinafter apparent are accomplished by providing a melting furnace having a vertical shaft melting chamber including a charge opening at an upper portion thereof through which scrap metal may be intermittently charged during furnace operation to form a column of metal. The lower portion of the furnace is provided with a plurality of downwardly inclined plasma arc torches which are coupled to actuation devices for extending the torches into the furnace beyond the interior wall thereof and for retracting the torches. The plasma arc torches are arranged in upper and lower vertically spaced planes for respectively preheating and melting the metal charge, the torches in each plane being equi-angularly spaced about the furnace wall. At its lower end, the furnace has a floor configured for collecting a pool of molten metal which is to be continuously discharged via an outlet to a holding tundish and/or metal purifying apparatus prior to casting in a continuous casting machine. According to another important aspect of the invention, the interior wall of the lower furnace portion is provided with refractory elements extending generally radially inwardly toward the furnace axis and at least partly surrounding each plasma arc torch for protecting the torch tips from damage when scrap metal is charged to the furnace and when the scrap metal column descends in the furnace during operation of the furnace.

Advantageously, these refractory elements are constructed in inverted, substantially U-shaped configuration to provide protection for the torch tips from above the plasma arc torches as well as from the lateral sides thereof. These refractory elements extend inwardly in a generally radial direction a distance sufficient to protectively shroud the torch tips when the torches are extended in close proximity to the charge for striking an arc therewith.

With these and other objections, advantages and features of the invention that may become hereinafter apparent, the nature of the invention may be more clearly understood by reference to the following detailed description of the invention, the appended claims and to the several views illustrated in the attached drawings.

BRIEF DESCRIPTION OF THE DRAWINGS

FIG. 2 is a horizontal cross-sectional view of the vertical shaft furnace of the invention taken along line II—II of FIG. 1;

FIG. 3 is a horizontal cross-sectional view of the vertical shaft furnace according to the invention taken along line III—III of FIG. 1; and FIG. 4 is a side elevation view, partly in cross-section, showing the mounting of a plasma arc torch in the sidewall of the vertical shaft furnace of the invention.

DETAILED DESCRIPTION OF A PREFERRED EMBODIMENT

Figure 1:
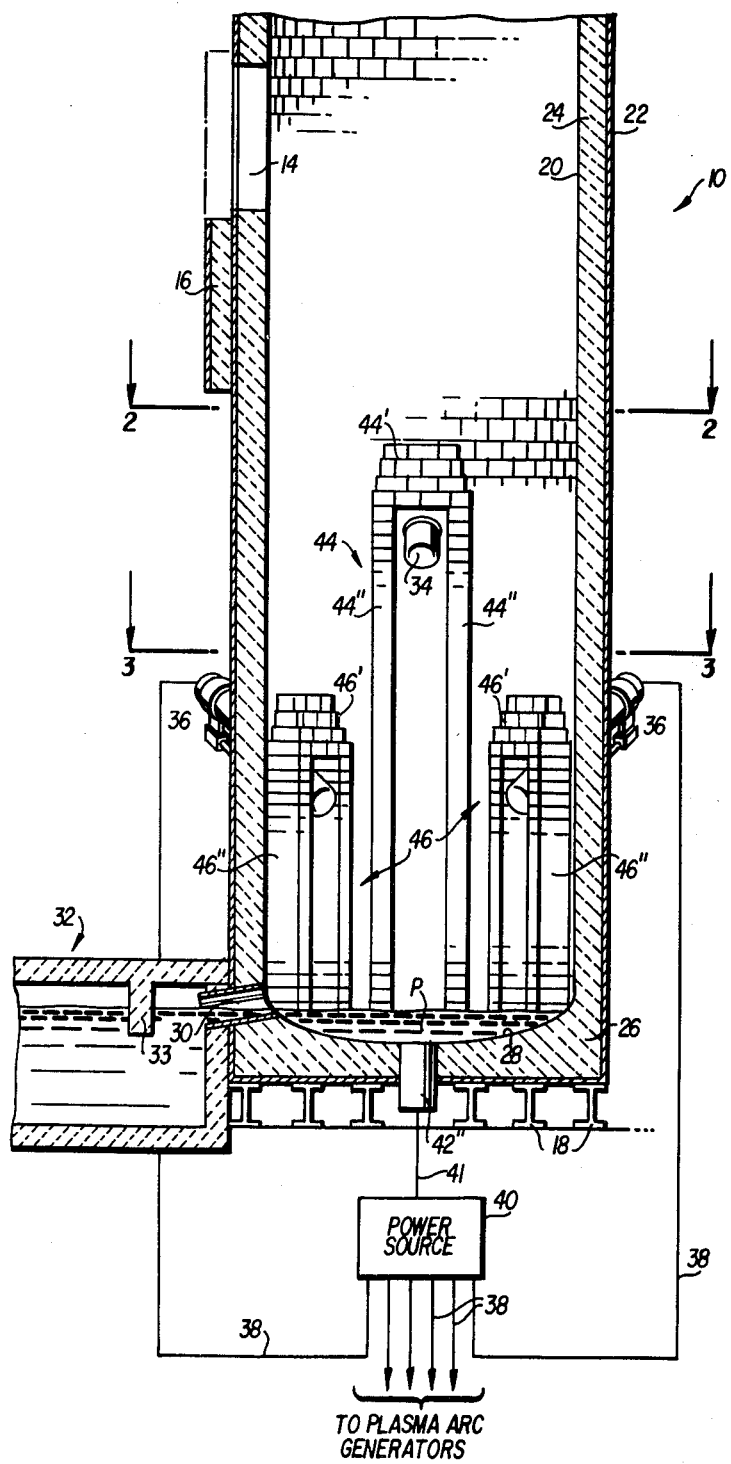
FIG. 1 is a partly broken, side elevation view in cross-section of a vertical shaft furnace employing sidewall-mounted plasma arc torches according to the present invention.

Referring now to the drawings wherein the same parts are identified throughout by the same reference numerals, there is illustrated in FIG. 1, a vertical shaft furnace, designated generally by reference numeral 10, for continuously melting metal. The furnace 10 is vertically elongated, preferably cylindrical in shape, and defines an interior cylindrical melting chamber 12 which is adapted to be gravity-charged, via an access opening 14, with metal pieces to be melted, such as scrap metal, copper cathode pieces or the like. The opening 14 is provided with a cover 16 for closing the opening when metal is not being charged to the furnace. If it is desired to accomplish meltdown of the metal charge in a controlled atmosphere, i.e., controlled by varying either the pressure or the gas composition of the atmosphere or both, the cover 16 may be provided with means for sealing the same about the opening 14.

The furnace wall 20 comprises an outer, cylindrical metallic sheath 22 and a refractory lining 24, which may be constructed, for example, of carbide brick or other suitable firebrick capable of withstanding the high temperatures which exist in the melting chamber. Although not particularly illustrated, the lining 24 may be comprised by one or more layers of insulating material or insulating brick disposed between the metallic sheath 22 and the high temperature resistant refractory lining 24.

The bottom or floor 26 of the melting chamber 12 is also formed of a refractory material and is concavely dished as at 28 to provide means for collecting a pool P of metal melted in the furnace. A downwardly-inclined refractory outlet conduit 30 extends through the lower portion of furnace wall 20 at a vertical level which permits outflow of molten metal only after the surface area of the metal pool P is substantially equivalent to the horizontal cross-sectional area of the melting chamber 12. After meltdown of the charge has commenced and the level of the pool P reaches the level of conduit 30, molten metal is continuously discharged into a holding tundish 32, or other apparatus, such as a molten metal purifying system, from which apparatus the molten metal is discharged into a continuous casting machine for continuously forming a cast metal bar in a manner well-known in the art and, therefore, not particularly illustrated. If the melting chamber atmosphere is controlled, the tundish 32 is preferably provided with a baffle 33 which forms an effective hydrostatic seal at the molten metal outlet conduit 30.

The system for supplying the heat energy necessary for continuously melting the metal charged to the furnace comprises a plurality of heat-producing means which, in the disclosed embodiment, comprise plasma arc generators or torches 34, 36, also known as "plasmatrons," and their associated electrical power supply and connections shown schematically in FIG. 1. Plasma arc torches suitable for use in the present invention and their construction and operation are well-known to those skilled in the art and, therefore, the specific details thereof are considered unnecessary to a complete understanding of the present invention. Such conventional plasma arc devices and their operation are disclosed and described in detail, for example, in U.S. Pat. Nos. 2,922,869; 3,147,330; 3,194,941; and 3,673,375. Plasma arc torches 34, 36 are equi-angularly spaced in a downwardly inclined attitude about the melting chamber axis in two vertically spaced planes, as best seen by referring to FIGS. 1–3. The torches 34 of the uppermost plane comprise preheating torches for preheating the metal charge descending by gravity downwardly through the melting chamber and the torches 36 of the lowermost plane comprise the working or melting torches for supplying the additional heat necessary for complete conversion of the preheated metal charge to a molten state. As shown in FIG. 1, the torches 34 in the upper row are vertically spaced from the inlet opening 14 a distance approximately equal to the inner diameter of the melting chamber 12, and the torches 36 in the lower row are vertically spaced from the lowermost portion of the melting chamber 12 a distance approximately equal to the inner diameter of the melting chamber. Moroever, the respective rows of torches are vertically spaced from one another a distance approximately equal to the inner dimater of the melting chamber 12.

As shown in FIG. 1, the plasma arc torches are connected in a conventional manner via electrical connectors 38 to one pole of a high voltage power source 40, the other pole of which is connected via an electrical connector 41 to an electrode 42 situated in the concave surface 28 of the furnace floor 26. The electrode 42 is arranged to make electrical contact with the metal charged to the furnace during start-up for striking the arc with the metal charge. Thereafter, during continuous furnace operation, the electrode 42 maintains electrical contact with the metal charge via the molten metal pool P.

Each of the plasma arc torches 34, 36 is advantageously provided with a protective refractory shroud 44, 46 which, in the described embodiment, comprises a refractory structure formed, preferably, of refractory brick, which extends substantially radially inwardly toward the axis of the melting chamber 12 and surrounds the torch tips at least one three sides, more particularly, the uppermost and lateral sides of the torches. The upper sides 44', 46' of the refractory shroud are constructed in an inclined or step-like fashion to guide the downwardly descending charge toward the furnace axis and to aid in preventing impaction of the metal charge on the upper end surfaces of the shrouds. Preferably, the lateral sides 44", 46" of the shrouds extend to the floor 26 of the furnace and thereby provide better structural support for the shroud.

The purpose of this protective shroud structure is to prevent damage to the plasma arc torch tips by dropped metal pieces which are gravity-charged to the furnace via opening 14 or by the column of metal which passes downwardly through the melting chamber during continuous operation of the furnace. It will be appreciated that without the provision of protective shrouds 44, 46 to prevent damage to the torch tips, they would have to be completely withdrawn from the melting chamber beyond the interior refractory lining 24. Thus, the metal charge would lie immediately adjacent the openings through which the torches extend. While it would be possible to strike an arc with the metal charge in this condition, the torches would have to be further retracted into the furnace wall to their working arc length thereby unnecessarily heating up the furnace wall and resulting in greater heat loss to the surroundings and less efficient operation. The protective shrouds are, therefore, effective to shift the maximum heat regions generated by the plasma arcs more closely to the furnace axis and farther from the furnace wall structure.

Referring now to FIG. 4, there is shown a plasma arc torch 34 or 36 extending through the furnace wall 24 with its tip in close proximity to the metal charged to the furnace for initially striking an arc therewith. After the arc is struck and stabilized, the torch 34 or 36 is retracted to its working arc length position shown in dotted lines in FIG. 4 by means of an actuation device 48 according to known operating procedures. As illustrated, the torch tip is located immediately below the upper wall 44' or 46' and between the lateral sides 44" and 46" of the protective shroud in such a way that the descending metal pieces which have been gravity-charged to the furnace are substantially prevented from making any damaging contact with the plasma arc torch tip. Upon retraction of the plasma arc torch to the working arc length position, the torch tip will still be protected from damage and will advantageously extend into the melting chamber well beyond the interior surface of the refractory lining 24.

In view of the foregoing, it should be apparent that there is provided, in accordance with the present invention, a novel vertical shaft furnace employing plasma arc torches for meltdown of a metal charge to be continuously supplied as molten metal to a continuous casting machine.

Although only a preferred embodiment is specifically illustrated and described herein, it will be appreciated that many modifications and variations of the present invention, particularly with respect to the configuration of the protective shroud, are possible in light of the above teachings and within the purview of the appended claims without departing from the spirit and intended scope of the invention.

What is claimed is:

1. In a vertical shaft furnace for melting metal materials of the type having a vertically elongated melting chamber through which metal descends during use of the furnace, including means defining an inlet opening at the upper portion of said melting chamber for charging metal into said melting chamber; means defining an outlet opening at the lower portion of said melting chamber for discharging molten metal therefrom; and a plurality of heat-producing means disposed in at least two vertically-spaced rows about the circumference of said melting chamber between said inlet and outlet openings for producing sufficient heat energy to effect melting of metal charged into the furnace inlet opening to form a continuously descending metal column terminating in a pool of molten metal at the lowermost portion of said melting chamber for discharge from the furnace outlet opening, the improvement comprising at least three circumferentially spaced-apart heat-producing means in each row, and the lowermost row of heat-producing means being vertically spaced from the lower-most portion of said melting chamber a distance approximately equal to the inner diameter of said melting chamber.

2. A vertical shaft furnace according to claim 1 wherein the rows of heat-producing means are vertically spaced from one another a distance approximately equal to the inner diameter of said melting chamber.

3. A vertical shaft furnace according to any one of claims 1 and 2; wherein the uppermost row of heat-producing means is vertically spaced from said inlet opening a distance approximately equal to the inner diameter of said melting chamber.

4. A vertical shaft furnace according to claim 1; wherein said lower portion of said melting chamber has a concavely shaped floor portion for collecting therein a pool of molten metla; and wherein said outlet opening is disposed at the upper region of said concavely shaped floor portion thereby ensuring that a continuous pool of molten metal is maintained in the lowermost portion of melting chamber during use of the furnace.

5. The improved vertical shaft furnace of claim 4 wherein: each row of heat-producing means is spaced from each neighboring row of heat-producing means a distance approximately equal to the inner diameter of said melting chamber; said inlet opening is spaced from its nearest neighboring row of heat-producing means a distance approximately equal to said inner diameter; and the heat-producing means in each row being substantially equi-angularly spaced around the furnace wall; thereby adapted to minimize heat energy lost to the surroundings while accomplishing meltdown in a minimum amount of time.

* * * * *